United States Patent

Weber et al.

Patent Number: 5,612,425
Date of Patent: Mar. 18, 1997

[54] MOLDING COMPOSITIONS BASED ON MODIFIED POLYARYL ETHERS

[75] Inventors: Martin Weber, Neustadt; Klaus Muehlbach, Gruenstadt; Eckhard M. Koch, Fussgoenheim, all of Germany

[73] Assignee: BASF Aktiengesellschaft, Ludwigshafen, Germany

[21] Appl. No.: 61,537

[22] Filed: May 14, 1993

Related U.S. Application Data

[63] Continuation of Ser. No. 857,134, Mar. 25, 1992, abandoned.

[30] Foreign Application Priority Data

Mar. 30, 1991 [DE] Germany .......................... 41 10 460.9
May 3, 1991 [DE] Germany .......................... 41 14 455.4

[51] Int. Cl.⁶ .................................................. C08F 283/00
[52] U.S. Cl. .......................... 525/534; 528/272; 528/288; 528/293; 528/296; 528/302; 528/306; 528/308.6; 528/310; 528/335; 525/419; 525/420; 525/437; 525/439; 525/446; 525/474; 525/535; 525/539; 525/540; 524/81
[58] Field of Search .................................. 525/471, 534, 525/419, 420, 437, 439, 446, 474, 535, 539, 540; 528/272, 288, 293, 296, 302, 306, 308.6, 310, 335; 524/81

[56] References Cited

U.S. PATENT DOCUMENTS

| | | |
|---|---|---|
| 3,655,822 | 4/1972 | McGrath . |
| 3,729,527 | 4/1973 | Nield . |
| 4,628,072 | 12/1986 | Shiraki et al. .............................. 525/51 |
| 4,797,457 | 1/1989 | Guiver et al. ............................. 528/171 |
| 4,804,723 | 2/1989 | Harris et al. .............................. 525/534 |
| 4,833,219 | 5/1989 | Guiver et al. ............................. 525/535 |
| 4,999,415 | 3/1991 | Guiver et al. ............................. 528/171 |

FOREIGN PATENT DOCUMENTS

| | | |
|---|---|---|
| 374988 | 6/1990 | European Pat. Off. . |
| 4110460 | 10/1992 | Germany . |
| 4114455 | 11/1992 | Germany . |
| 55118926 | 10/1988 | Japan . |
| 270739 | 11/1988 | Japan . |
| 2-140235 | 5/1990 | Japan . |
| WO8700540 | 1/1987 | WIPO . |

OTHER PUBLICATIONS

Encyclopedia of Chemical Technology, vol. 18, pp. 832–833.
World Patents Index Latest; Derwent Publications Ltd.; London, GB; Nov. 8, 1988; "Preparation of heat resistant graft copolymer. . . ".
Y. Nagase, A. Naruse and K. Matsui, Polymer 30, (2989).
B. C. Johnson et al., J. Polym. Sci. A 22 (1984) 723–737.
A. Warshawsky et al., J. Polym. Sci., A 28 (1990) 2885–2905.

Primary Examiner—Samuel A. Acquah
Attorney, Agent, or Firm—Keil & Weinkauf

[57] ABSTRACT

Molding compositions based on polyaryl ethers A, are obtainable by reacting polyaryl ethers I with repeating structural elements

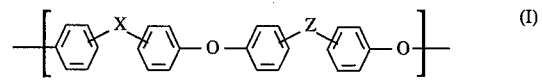

or derivatives thereof substituted by $C_1$–$C_6$-alkyl, alkoxy, aryl, chlorine or fluorine in the nucleus, where X and Z, independently of one another, are each —$SO_2$—, —O—, —S—, >C=O a chemical bond or —CRR'—, R and R' are each hydrogen, $C_1$–$C_6$-alkyl or alkoxy, R' is also aryl or fluoro- or chloro-substituted aryl, with the proviso that X and Z are not both —O—, with a reactive compound which, besides a C—C double or triple bond, contains one or more carbonyl, carboxylic acid, carboxylate, acid anhydride, amide, imide, carboxylic ester, amino, hydroxyl, epoxy, oxazoline, urethane, urea, lactam or halobenzyl moieties.

9 Claims, No Drawings

MOLDING COMPOSITIONS BASED ON MODIFIED POLYARYL ETHERS

This application is a continuation of application Ser. No. 07/857,134, filed on Mar. 25, 1992 now abandoned.

The present invention relates to molding compositions based on a polyaryl ether A obtainable by reacting polyaryl ethers I with repeating structural elements

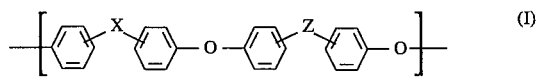 (I)

or derivatives thereof substituted by $C_1$–$C_6$-alkyl, alkoxy, aryl, chlorine or fluorine in the nucleus, where X and Z, independently of one another, are each —$SO_2$—, —O—, —S—, >C=O, a chemical bond or —CRR'—, R and R' are each hydrogen, $C_1$–$C_6$-alkyl or alkoxy, R' is also aryl or fluoro- or chloro-substituted aryl, with the proviso that X and Z are not both —O—, with a reactive compound which, besides a C—C double or triple bond, contains one or more carbonyl, carboxylic acid, carboxylate, acid anhydride, amide, imide, carboxylic ester, amino, hydroxyl, epoxy, oxazoline, urethane, urea, lactam or halobenzyl moieties.

In another embodiment, the present invention relates to molding compositions which contain, based on the total of components A to C,
A) from 5 to 95% by weight of polyaryl ether A,
B) from 0 to 90% by weight of polyaryl ether I and
C) from 5 to 45% by weight of fibrous or particulate reinforcing agents or fillers or mixtures thereof.

The present invention also relates to molding compositions which contain, based on the total of components A to E,
A) from 1 to 99% by weight of polyaryl ether A,
B) from 0 to 90% by weight of polyaryl ether I,
C) from 0 to 45% by weight of fibrous or particulate reinforcing agents or fillers or mixtures thereof,
D) from 1 to 99% by weight of thermoplastic polyamides D and
E) from 0 to 25% by weight of impact modifying rubbers E.

Polyaryl ethers have a number of interesting properties such as good heat resistance, good mechanical strength and low water absorption.

However, these materials can be employed only with provisos for many applications.

For example, for use as thermally stable adhesive the polyaryl ethers would have to adhere better to polar surfaces.

Moreover, the rigidity of the polyaryl ethers is frequently insufficient for the needs of automobile and apparatus construction. It can in general be satisfactorily increased by incorporating reinforcing agents and fillers only when the thermoplastic adheres well to these additives. To achieve this, as a rule the surfaces of the reinforcing agents and fillers are treated with compounds suited to the particular thermoplastic, e.g. aminosilane or polyurethane compounds. However, the polyaryl ethers have limited compatibility with these sizes.

There is also interest in mixing polar thermoplastics such as polyamide with polyaryl ethers in order to prepare blends which have a greater heat resistance than pure polyamide. Moreover, addition of polyamide to the polyaryl ethers might improve their flow properties and solvent resistance.

Mixtures (blends) of polyaryl ethers (e.g. polyether sulfones) and polyamides are known and are described, for example, in DE-A 21 22 735. However, because of the thermodynamic incompatibility of polyaryl ethers and polyamides, mixtures of this type have unsatisfactory mechanical properties, in particular inadequate toughness expressed by the low measured penetration energy.

A fundamental principle for making immiscible polymers compatible is to incorporate small amounts (from 1 to 10% by weight) of block or graft copolymers whose segments are each compatible with one component of the blend into the relevant blends (D. R. Paul in "Polymer Blends", Vol. 2, Academic Press Inc., New York, 1978, D. R. Paul, S. Newman Eds.)

This principle has also been applied to polyaryl ether/ polyamide blends. US-C 3 655 822 describes, inter alia, blends of PSU block nylon 6 and polysulfone or nylon 6; the stress cracking resistance of the blends is better than that of polysulfone.

These blends also have a distinctly better heat resistance than nylon 6. However, these blends have not achieved any industrial importance because of the complicated process for preparing such block copolymers.

EP-A 374 988 describes blends similar to those described above composed of polysulfone, nylon 4.6 and polysulfone-block-nylon 6. An improvement in the notched impact strength is achieved by incorporating only small amounts of block copolymer (about 5% by weight). These blends have not found wide use either.

Functionalized polyaryl ethers are known and to date have been mainly used in membrane technology. Because of the high glass transition temperature, the excellent mechanical properties and the good chemical resistance, these materials can be exposed to a wide variety of chemical substances under the conditions (temperature, pressure), which are sometimes extreme, of the separation process.

Polyaryl ethers have therefore been modified particularly with a view to improving the selectivity and permeability for particular substrates.

This entails, in particular, reaction or substitution on the aromatic groups in the chain backbone, such as electrophilic substitution and metallization.

Metallization of polysulfones with butyllithium provides the chain backbone with ionic centers which can be used as initiation sites for a grafting-from reaction in which, for example, anionic polymerization of hexamethyltrisiloxane results in polysulfone-g-polydimethylsiloxane (Y. Nagase, A. Naruse and K. Matsui, Polymer 30, (1989) 1931).

Functionalization with polar groups starting from metallized polysulfone is suitable, however, since the metallization must take place under inert gas and anhydrous conditions, virtually only for experiments on the laboratory scale.

Electrophilic substitution of polyaryl ethers has been described for the examples of sulfonation (B. C. Johnson et al. J. Polym. Sci. A 22 (1984) 723–737), bromination (M. D. Guiver et al. Preprints, Speciality Polymers 88) and halomethylation (A. Warshawsky et al. J. Polym. Sci., A 28 (1990) 2885–2905).

However, these reactions take place only under drastic conditions and in some cases are associated with breakdown and crosslinking reactions; a considerable cost in involved in removal of catalysts.

It is an object of the present invention to provide modified polyaryl ethers with improved bond strength and/or improved compatibility with other thermoplastics or fillers.

We have found that this object is achieved by the molding compositions based on polyaryl ethers A defined in the introduction.

Polyaryl Ethers A

The polyaryl ethers A can be obtained by reacting a polyaryl ether I with the general structural element I

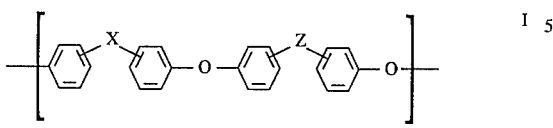

or derivatives thereof substituted by $C_1$–$C_6$-alkyl, alkoxy, aryl, chlorine or fluorine in the nucleus, where X and Z, independently of one another, are each —$SO_2$—, —O—, —S—, >C=O, a chemical bond or —CRR'—, R and R' are each hydrogen, $C_1$–$C_6$-alkyl or alkoxy, R' is also aryl or fluoro- or chloro-substituted aryl, with a reactive compound which, besides a C—C double or triple bond, contains one or more carbonyl, carboxylic acid, carboxylate, acid anhydride, amide, imide, carboxylic ester, amino, hydroxyl, epoxy, oxazoline, urethane, urea, lactam or halobenzyl moieties. It is possible to use as polyaryl ethers I copolymers, such as block or graft copolymers, which contain polyaryl ether segments.

It may be expedient to carry out the reaction in the absence of radical initiators. However, in general, the reaction is carried out in the presence of radical initiators.

The preparation of the polyaryl ethers is generally known (cf. for example, GB 1 152 035; U.S. Pat. No. 4,870,153), as is the synthesis of copolyaryl ethers with a block structure (DE 3 742 264).

The polyaryl ethers can contain any required end groups such as halogen, methoxy, hydroxyl, phenoxy, benzyloxy or amino end groups. Polyaryl ethers with halogen or methoxy end groups are preferably used.

The molecular weight of suitable polyaryl ether I is generally in the range 1500–60000 g/mol.

If the polyaryl ether segments are present in copolymers, if they can be prepared, with structural units of polyamides, polyesters, aromatic polycarbonates or polyester carbonates, polysiloxanes, polyimides or polyether imides, the molecular weights of the blocks or of the grafting arms in the copolymers are in the range 1000–30000 g/mol, and the blocks of different structure can be arranged alternately or randomly in the copolymers. The content of polyaryl ether in the copolymers should be 3–97, preferably 10–90 and, in particular, 20–80% by weight. Methods for synthesizing such copolymers are described, for example, in A. Noshay et al., Block Copolymers, Academic Press, 1977.

Suitable conditions for synthesizing polyaryl ethers are described, for example, in EP-A 113 112 and EP-C 135 130.

It is particularly suitable to react the monomers in aprotic polar solvents in the presence of anhydrous alkali metal carbonate. A particularly preferred combination is N-methylpyrrolidone as solvent and potassium carbonate as catalyst, or reaction in the melt.

The copolymers containing polyaryl ethers or polyaryl ether segments are modified according to the invention by employing reactive compounds which, besides a C—C double or triple bond, contain one or more carbonyl, carboxylic acid, carboxylate, acid anhydride, amide, imide, carboxylic ester, amino, hydroxyl, epoxy, oxazoline, urethane, urea, lactam or halobenzyl moieties.

Examples of typically suitable compounds are maleic acid, methyl maleate, itaconic acid, tetrahydrophthalic acid, the anhydrides and imides thereof, fumaric acid, the mono- and diesters of these acids, e.g. of $C_1$–$C_{18}$-alkanols, the mono- or diamides of these acids such as N-phenylmaleimide, and maleic hydrazide.

Preferably used are α, β-unsaturated dicarboxylic acids or the anhydrides, diesters and monoesters thereof, of the following general structure IV and V

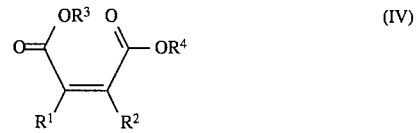

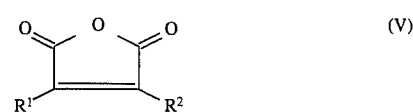

where $R^1$, $R^2$, $R^3$ and $R^4$ can each, independently of one another, be hydrogen and $C_1$–$C_{18}$-alkyl.

Particularly suitable compounds are maleic anhydride, fumaric acid and itaconic acid.

In the process on which the invention is based, the polymers and the reactive compound are reacted, for example, in an aromatic solvent. Particularly suitable solvents have proven to be chlorobenzene, o-dichlorobenzene and N-methylpyrrolidone. Any conventional radical initiator is generally employed for this purpose. The reaction is generally carried out at 75°–150° C. The reaction product is obtained by precipitation with a conventional precipitant, such as low molecular weight alcohol or ketone, or by removing the solvent (e.g. in vented extruder, thin-film evaporator).

In another embodiment, the reactants are reacted at 270°–350° C. in the melt in a mixing unit operating continuously or batchwise (e.g. single or twin screw extruder, kneader).

The reactive compound is preferably metered in liquid form into the melt of the polymer, in particular in the kneading zone of a mixing unit.

The polyaryl ethers A preferably used in the molding compositions according to the invention are modified polyaryl ethers I obtained by reacting from 80 to 99.9% by weight, in particular from 90 to 99% by weight, of the unmodified polyaryl ether I with from 0.1 to 20% by weight, in particular from 1 to 10% by weight, of the reactive compound.

Particularly preferred molding compositions are based on polyaryl ether sulfones grafted with from 0.1 to 1.5% by weight of maleic anhydride. Preferred polyaryl ether sulfones contain from 5 to 95 mol % of units II

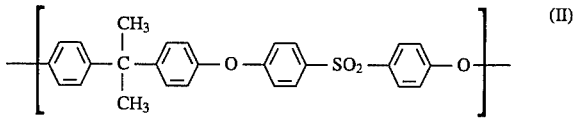

and from 5 to 95 mol % of units III

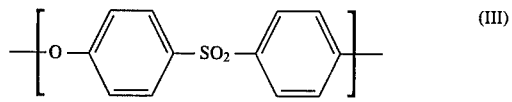

Polyaryl ether sulfones with from 80 to 95, preferably from 85 to 95, mol % of units of the formula II and III and, correspondingly, from 5 to 20, preferably 5 to 15, mol % of units of the formula III and II may be particularly mentioned here.

Radical initiators which can be used are, as a rule, the compounds described in the specialist literature (e.g. J. K. Kochi, "Free Radicals", J. Wiley, New York, 1973).

Particularly suitable radical initiators are: di(2,4-dichlorobenzoyl) peroxide, di-tert-butyl peroxide, di(3,5,5-trimethylhexyl) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butylperoxy-3,3,5-trimethylcyclohexane, tert-butylperoxy isopropyl carbonate, tert-butyl peroxy-3,3,5-trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide and 1,3-di(tert-butylperoxyisopropyl)benzene.

Mention may likewise be made of organic hydroperoxides such as diisopropylbenzene monohydroperoxide, cumene hydroperoxide, tert-butyl hydroperoxide, p-menthyl hydroperoxide and pinane hydroperoxide, and highly branched alkanes. Examples of the latter are 2,3-dimethyl-2,3-diphenylbutane, 3,4-dimethyl-3,4-diphenylhexane and 2,2,3,3-tetraphenylbutane; because of their decomposition properties they are particularly suitable for modification in the melt.

The radical initiators are normally used in amounts of about 0.01 to 1% of the weight of the polyaryl ether I. It is, of course, also possible to employ mixtures of different radical initiators.

The reactive groups in the modified polyaryl ethers A can also be used as starting point for further grafting and modification reactions.

The content of functional groups in the modified polyaryl ether A can be determined by conventional methods of general organic analysis, such as titration, and IR, UV and NMR spectroscopy.

The molding compositions according to the invention may, besides the modified polyaryl ethers A, also contain other components which are detailed hereinafter.

In one of the preferred embodiments, the molding compositions contain the components A) from 5 to 95% by weight, in particular from 5 to 50% by weight, of polyaryl ether A,
B) from 0 to 90% by weight, in particular from 15 to 80% by weight, of polyaryl ether I and
C) from 5 to 45% by weight, in particular from 10 to 35% by weight, of fibrous or particulate reinforcing agents or fillers or mixtures thereof, where the total of components A to C always amounts to 100% by weight.

In another preferred embodiment, the molding compositions contain the components A) from 1 to 99% by weight, in particular from 10 to 90% by weight, of polyaryl ether A,
B) from 0 to 90% by weight, in particular from 5 to 80% by weight, of polyaryl ether I,
C) from 0 to 45% by weight, in particular from 10 to 35% by weight, of fibrous or particulate reinforcing agents or fillers or mixtures thereof,
D) from 1 to 99% by weight, in particular from 10 to 90% by weight, of thermoplastic polyamides D and
E) from 0 to 25% by weight, in particular from 2 to 20% by weight, of impact modifying rubbers E.

Further preferred molding compositions according to the invention contain the components A) from 10 to 90% by weight of polyaryl ether A,
B) from 0 to 80% by weight of polyaryl ether I,
D) from 10 to 90% by weight of thermoplastic polyamides D and
E) from 2 to 20% by weight of impact modifying rubbers E.

Component B

Besides the modified polyaryl ethers A, the molding compositions according to the invention can also contain unmodified polyaryl ethers. It is possible to use as component B the unmodified copolymers which contain polyaryl ethers I and polyaryl ether segments and which are described for preparing the polyaryl ethers A. The general structure of the polyaryl ether segments is represented by units of the formula I, and mixtures with corresponding derivatives substituted by $C_1$–$C_6$-alkyl or alkoxy, aryl, chlorine or fluorine in the nucleus are also suitable.

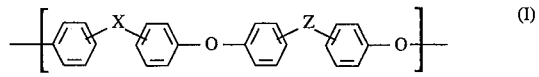

X and Z are each, independently of one another, —$SO_2$—, —O—, —S—, —CO—, a chemical bond or —CRR'— where R and R' can in general each be hydrogen, or else $C_1$–$C_6$-alkyl or alkoxy, aryl or fluorine or chlorine derivatives thereof.

These polyaryl ethers I are, as indicated above, known.

The content of the polyaryl ethers I in the molding compositions according to the invention can be up to 90, preferably up to 80%, by weight.

Component C

Besides components A and B, the molding compositions according to the invention can also contain reinforcing agents or fillers. The molding compositions according to the invention can contain as component C, for example, up to 45, preferably from 10 to 35%, by weight of fibrous or particulate fillers or reinforcing agents or mixtures thereof.

Preferred fibrous fillers or reinforcing agents are carbon fibers, potassium titanate whiskers, aramid fibers and, particularly preferably, glass fibers. When glass fibers are used, these can be treated with a size and an adhesion promoter to improve compatibility with the matrix material. The carbon and glass fibers used generally have a diameter in the range from 6 to 20 μm.

The glass fibers can be incorporated both in the form of chopped strands and in the form of continuous strands (rovings). The average length of the glass fibers in the finished injection molding is preferably in the range from 0.08 to 0.5 mm.

Carbon or glass fibers can also be employed in the form of glass fabrics, glass mats or rovings.

Suitable particulate fillers are amorphous silica, asbestos, magnesium carbonate (chalk), powdered quartz, mica, talc, feldspar, glass beads and, in particular, calcium silicates such as wollastonite and kaolin (especially calcined kaolin).

Examples of preferred combinations of fillers are 20% by weight of glass fibers with 15% by weight of wollastonite and 15% by weight of glass fibers with 15% by weight of wollastonite.

Component D

Besides components A to C, the molding compositions according to the invention can also contain thermoplastic polyamides. The polyamides present as component D in the compositions are likewise known and comprise partly crystalline and amorphous resins with a molecular weight (weight average) of at least 5000, which are usually called nylon. Polyamides of this type are described, for example, in U.S. Pat. Nos. 2,071,250, 2,071,251, 2,130,523, 2,130,948, 2,241,322, 2,312,966, 2,512,606 and 3,393,210.

The polyamides D can be prepared, for example, by condensation of equimolar amounts of a saturated or an aromatic dicarboxylic acid of 4 to 12 carbons with a saturated or aromatic diamine of up to 14 carbons, or by condensation of ω-amino carboxylic acids, or polyaddition of appropriate lactams.

Examples of polyamides of this type are polyhexamethyleneadipamide (nylon 66), polyhexamethyleneazelaamide (nylon 69), polyhexamethylenesebacamide (nylon 610), polyhexamethylenedodecanedioamide (nylon 612), the polyamides obtained by ring opening of lactams, such as polycaprolactam, polylaurolactam, and poly-11-aminoundecanoic acid and a polyamide from di(p-aminocyclohexyl)methane and dodecanedioic acid.

It is also possible to use polyamides which have been prepared by copolycondensation of two or more of the abovementioned polymers or their components, e.g. copolymers of adipic acid, isophthalic acid or terephthalic acid and hexamethylenediamine or copolymers of caprolactam, terephthalic acid and hexamethylenediamine. Partially aromatic copolyamides of this type contain as component α1) from 40 to 90% by weight of units derived from terephthalic acid and hexamethylenediamine. A small proportion of the terephthalic acid, preferably not more than 10% of the total weight of aromatic dicarboxylic acids employed, can be replaced by isophthalic acid or other aromatic dicarboxylic acids, preferably those in which the carboxyl groups are in the para positions.

Besides the units derived from terephthalic acid and hexamethylenediamine, the partially aromatic copolyamides contain units α2) derived from ε-caprolactam and/or units derived from adipic acid and hexamethylenediamine.

The content of units derived from ε-caprolactam is up to 50% by weight, preferably from 20 to 50% by weight, in particular from 25 to 40% by weight, while the content of units derived from adipic acid and hexamethylenediamine is up to 60% by weight, preferably from 30 to 60% by weight and, in particular, from 35 to 55% by weight.

The copolyamides can also contain both units of ε-caprolactam and units of adipic acid and hexamethylenediamine; in this case it must be ensured that the content of units free of aromatic groups is at least 10% by weight, preferably at least 20% by weight. The ratio of units derived from ε-caprolactam to those derived from adipic acid and hexamethylenediamine is not subject to any special restriction.

Polyamides with from 50 to 80, in particular from 60 to 75%, by weight of units derived from terephthalic acid and hexamethylenediamine (units α1)) and from 20 to 50, preferably from 25 to 40%, by weight of units derived from ε-caprolactam (units α2)) have proven particularly advantageous for many applications.

Partially aromatic copolyamides can be prepared, for example, by the process described in EP-A 129 195 and 129 196.

Preferred partially aromatic polyamides are those which contain below 0.5% by weight of units of dihexamethylenetriamine.

Linear polyamides with a melting point above 200° C. are preferred.

Preferred polyamides are polyhexamethyleneadipamide, polyhexamethylenesebacamide and polycaprolactam, and nylon 6/6T and nylon 66/6T. The polyamides generally have a relative viscosity of from 2.0 to 5 determined on a 1% by weight solution in 96% strength sulfuric acid at 23° C., which corresponds to a molecular weight of about 15,000 to 45,000. Polyamides with a relative viscosity of from 2.4 to 3.5, in particular from 2.5 to 3.4, are preferably used.

Mention should also be made of polyamides obtainable, for example, by condensation of 1,4-diaminobutane with adipic acid at elevated temperature (nylon 4.6). Processes for preparing polyamides of this structure are described, for example, in EP-A 38 094, EP-A 38 582 and EP-A 39 524.

The content of polyamides D in the molding compositions according to the invention can be from 1 to 99, preferably from 10 to 90 and, in particular, from 10 to 40% by weight.

Component E

Besides components A to D, the molding compositions according to the invention can also contain up to 25, preferably from 2 to 20%, by weight of an impact modifying rubber E. Conventional impact modifiers which are suitable for polyamides and/or polyaryl ethers can be used.

Rubbers which increase the toughness of polyamides generally have two essential features: they contain an elastomer which has a glass transition temperature below −10° C., preferably below −30° C., and they contain at least one functional group able to react with the polyamide. Examples of suitable functional groups are carboxylic acid, carboxylic anhydride, carboxylic ester, amide, imide, amino, hydroxyl, epoxide, urethane and oxazoline moieties.

Examples of rubbers which increase the toughness of the blends are the following: EP and EPDM rubbers grafted with the abovementioned functional groups. Examples of suitable grafting reagents are maleic anhydride, itaconic acid, acrylic acid, glycidyl acrylate and glycidyl methacrylate.

These monomers can be grafted onto the polymer in the melt or in solution, in the presence or absence of a radical initiator such as cumene hydroperoxide.

Copolymers of α-olefins may also be mentioned. The α-olefins are normally monomers of 2 to 8 carbons, preferably ethylene and propylene. Suitable comonomers have proven to be alkyl acrylates or methacrylates derived from alcohols of 1 to 8 carbons, preferably from ethanol, butanol or ethylhexanol, and reactive comonomers such as acrylic acid, methacrylic acid, maleic acid, maleic anhydride or glycidyl (meth)acrylate and, furthermore, vinyl esters, especially vinyl acetate. Mixtures of various comonomers can likewise be employed. Copolymers of ethylene with ethyl or butyl acrylate and acrylic acid and/or maleic anhydride have proven particularly suitable.

The copolymers can also be prepared in a high-pressure process under from 400 to 4500 bar or by grafting the comonomers onto the poly-α-olefin. The content of α-olefin in the copolymer is generally in the range from 99.95 to 55% by weight.

Another group of suitable elastomers to be mentioned are core-shell graft rubbers. These are graft rubbers prepared in emulsion and composed of at least one hard and one soft component. A hard component normally means a polymer with a glass transition temperature of at least 25° C., and a soft component normally means a polymer with a glass transition temperature of not more than 0° C. These products have a structure comprising a core and at least one shell, and the structure results from the sequence of monomer addition. The soft components are generally derived from butadiene, isoprene, alkyl acrylates or alkyl methacrylates, with or without further comonomers. Examples of suitable comonomers are styrene, acrylonitrile and crosslinking or graftlinking monomers with more than one polymerizable double bond such as diallyl phthalate, divinylbenzene, butanediol diacrylate or triallyl (iso)cyanurate. The hard components are generally derived from styrene, α-methylstyrene and copolymers thereof, preferred comonomers being acrylonitrile, methacrylonitrile and methyl methacrylate.

Preferred core-shell graft rubbers contain a soft core and a hard shell or a hard core, a first soft shell and at least one further hard shell. The incorporation of functional groups such as carbonyl, carboxylic acid, anhydride, amide, imide, carboxylic ester, amino, hydroxyl, epoxy, oxazoline, urethane, urea, lactam or halobenzyl moieties is in this case preferably carried out by adding suitable functionalized monomers in the polymerization of the last shell. Examples of suitable functionalized monomers are maleic acid, maleic anhydride, mono- or diesters of maleic acid, tert-butyl (meth)acrylate, acrylic acid, glycidyl (meth)acrylate and vinyloxazoline. The content of monomers with functional groups is generally from 0.1 to 25%, preferably from 0.25 to 15%, of the total weight of the core-shell graft rubber. The ratio of soft to hard components is generally from 1:9 to 9:1, preferably 3:7 to 8:2, by weight.

Rubbers which increase the toughness of polyamides are described, for example, in EP-A 208 187.

Another group of suitable impact modifiers $\alpha_3$) are thermoplastic polyester elastomers. In this connection, polyester elastomers mean segmented copolyether-esters which contain long-chain segments which are usually derived from poly(alkylene) ether glycols and short-chain segments which are derived from low molecular weight diols and dicarboxylic acids. Products of this type are described in the literature, e.g. in U.S. Pat. No. 3,651,014. Corresponding products are also commercially available under the names Hytrel® (Du Pont), Arnitel® (Akzo) and Pelprene® (Toyobo Co. Ltd).

It is, of course, also possible to employ mixtures of various rubbers.

Besides the components A to E described, the molding compositions according to the invention can also contain, for example, up to 40% by weight of other additives such as flameproofing agents and stabilizers.

The molding compositions according to the invention can be prepared by conventional processes, for example extrusion.

If the thermoplastic molding compositions according to the invention contain other components besides the polyaryl ethers A, the molding compositions can be prepared, for example, by the starting components being mixed in conventional mixing apparatus such as screw extruders, preferably twin screw extruders, Brabender mills or Banbury mills, and kneaders, and subsequently extruded. After the extrusion, the extrudate is cooled and comminuted.

The sequence of mixing the components can vary. Thus, two or three components can be mixed first, or alternatively all the components can be mixed together.

Vigorous mixing is advantageous in order to obtain a molding composition of maximum homogeneity. Mixing at from 280° to 380° C. for, on average, from 0.2 to 30 minutes is generally necessary for this. The molding compositions according to the invention based on the polyaryl ethers A display high bond strength and are therefore suitable as thermally stable adhesives. In addition, the filled molding compositions display very good toughness and strength. They are therefore suitable, for example, for producing moldings exposed to high stress.

The molding compositions according to the invention which contain thermoplastic polyamides have good multiaxial toughness, mechanical strength and stress cracking resistance. Because of their high heat resistance and good mechanical properties, these molding compositions are suitable for producing moldings, especially for electrical and electronic components. The high heat resistance in combination with good chemical resistance also makes it possible to use them in the construction of chemical plant.

EXAMPLES

In the following Examples, the content of maleic anhydride in % by weight is determined by potentiometric titration of a solution of the polyaryl ether A in dimethylformamide against methanolic KOH solution.

The apparent molecular weight of the products was determined by gel permeation chromatography; this method can also be used to establish whether the product contains unreacted low molecular weight modifier. Molding compositions according to the invention as thermally stable adhesives (Examples 1 to 3)

Example 1

10 g of a polyaryl ether composed of 2,2-di(4-hydroxyphenyl)propane (bisphenol A) and di(4-chlorophenyl) sulfone (polysulfone; VN=64 ml/g measured in 1% strength solution in a 1:1 mixture of phenol and 1,2-dichlorobenzene, e.g. Ultrason® S 2010) were dissolved in 100 ml of chlorobenzene and heated to 130° C. At this temperature, a total of 1.13 g (0.011 mol) of maleic anhydride (MA) dispersed in 4 ml of chlorobenzene, and 0.17 g (0.44 mmol) of dicumyl peroxide dissolved in 4 ml of chlorobenzene, were slowly added dropwise over the course of 4 hours. The product was isolated by precipitation with 500 ml of ethanol. The result was a white powder.

Example 2

10 g (0.4 mmol) of the polysulfone used in Example 1 were dissolved in 100 ml of chlorobenzene, and the solution was heated to 130° C. 1.13 g (0.011 mol) of maleic anhydride dispersed in 4 ml of chlorobenzene were added over a period of 4 h, ie. without dicumyl peroxide. The product was isolated by precipitation with 500 ml of ethanol. A white powder was obtained.

Example 3

6 kg of the polysulfone from Example 1 and 53 g of maleic anhydride were mixed at a melt temperature of 310° C. in a twin screw extruder with a throughput of 10 kg/h. The product was dissolved in THF and purified by reprecipitation from THF solution with ethanol three times; a white powder was finally obtained.

Example 4

6 kg of a polyaryl ether composed of di(4-hydroxyphenyl) sulfone and di(4-chlorophenyl) sulfone (polyether sulfone; VN=59 ml/g measured in 1% strength solution in a 1:1 mixture of phenol and 1,2-dichlorobenzene; e.g. Ultrason® S 2010 BASF) and 106 g of maleic anhydride were mixed at 340° C. in a twin screw extruder with a throughput of 10 kg/h. The product was purified by precipitation from N-methylpyrrolidone solution in water twice. The result was a yellowish product with a VN of 57 ml/g measured in 1% strength solution in a 1:1 mixture of phenol and 1,2-dichlorobenzene, and containing 0.23% by weight of chemically bonded maleic anhydride.

Application Tests

The products obtained in each case were investigated for maleic anhydride residues by gel permeation chromatography (GPC) in 1% strength solution; no free MA was found in any case.

The bond strength of the modified polyaryl ethers is tested as follows: 2 metal plates are bonded with the molding composition at 300°–350° C. (contact area 2×2 cm) using 0.6 g of polymer powder in each case, and bringing the plates together always with the same pressure. The bond strength was determined in a tensile test with a rate of straining of 0.1 cm/min.

The results of the measurements are listed in the following table. The comparative test relates to unmodified polysulfone.

TABLE 1

Molding compositions as thermally stable adhesive

| Example | $M_w$ | % by wt MA[1] | Bond strength [N/cm$^2$] |
|---|---|---|---|
| 1 | 42,000 | 0.4 | 4300 |
| 2 | 41,500 | 0.1 | 3690 |
| 3 | 38,000 | 0.2 | 3800 |
| 4 | 40,000 | 0.23 | 4200 |
| Comparative 1 | 44,000 | 0 | 3080 |
| Comparative 2 | 41,000 | 0 | 3210 |

[1]Chemically bonded MA

The modified polyaryl ethers have much higher bond strengths than the unmodified compositions.

The impact strength was determined on standard small specimens by the DIN 53 453 method, and the modulus of elasticity and tensile strength were determined in a tensile test on dumb bell specimens by the DIN 53 455 method.

The compositions of the molding compositions and the results of the application tests are to be found in Table 2.

TABLE 2

| | Glass fiber-reinforced molding compositions According to the invention | | | | | | | | Comparative | |
|---|---|---|---|---|---|---|---|---|---|---|
| Molding composition No. | 5 | 6 | 7 | 8 | 9 | 10 | 11 | 12 | C3 | C4 |
| Component (% by weight) | | | | | | | | | | |
| $A_1$ | 5 | 20 | 50 | — | — | — | 10 | 30 | — | — |
| $A_2$ | — | — | — | 10 | 30 | 70 | — | — | — | — |
| $B_1$ | 65 | 50 | 20 | — | — | — | — | — | 70 | — |
| $B_2$ | — | — | — | 60 | 40 | — | 60 | 40 | — | 70 |
| C | 30 | 30 | 30 | 30 | 30 | 30 | 30 | 30 | 30 | 30 |
| Notched impact strength [kJ/m$^2$] | 21.6 | 26 | 29 | 23.6 | 29 | 36 | 22.7 | 28 | 19.2 | 20.6 |
| Modulus of elasticity [N/mm$^2$] | 9850 | 9950 | 9900 | 10500 | 10400 | 10400 | 10450 | 10400 | 9900 | 10600 |
| Tensile strength [N/mm$^2$] | 129 | 134 | 139 | 156 | 163 | 169 | 155 | 161 | 125 | 152 |

Glass fiber-reinforced molding compositions according to the invention (Examples 5 to 12)

Component $A_1$
See Example 3 for preparation.

Component $A_2$
See Example 4 for preparation

Component $B_1$
Polyaryl ether composed of bisphenol A and di(4-chlorophenyl) sulfone (polysulfone; VN=64 ml/g measured in 1% strength solution in a 1:1 mixture of phenol and 1,2-dichlorobenzene; e.g. Ultrason® S 2010, BASF).

Component $B_2$
Polyaryl ether composed of di(4-hydroxyphenyl) sulfone and di(4-chlorophenyl) sulfone (polyether sulfone; VN=59 ml/g measured in 1% strength solution in a 1:1 mixture of phenol and 1,2-dichlorobenzene; e.g. Ultrason® E 2010, BASF).

Component C
Rovings with a thickness of 10 μm composed of low alkali glass treated with a polyurethane size. After incorporation, the average length of the glass fibers was approximately 0.1–0.5 mm.

Preparation of the Glass Fiber-Reinforced Molding Compositions

Components A, B and C were mixed in a twin screw extruder at a melt temperature of from 310° to 340° C. The melt was passed through a water bath and granulated.

The dried granules were converted at from 310° to 340° C. into standard small specimens (10×10×3 mm) and dumb bell specimens.

Polyamide-Containing Molding Compositions According to the Invention (Examples 13–24)

Component $D_1$
Polyhexamethyleneadipamide with a K value (Fikentscher) of 76, corresponding to a relative viscosity $\eta_{rel}$ of 2.95, measured on a 1% by weight solution in 96% strength sulfuric acid.

Component $D_2$
Partially aromatic copolyamide condensed in a conventional manner (cf. EP-A 129 195) from 55 parts by weight of terephthalic acid, 35 parts of ε-caprotactam and 38.5 parts of hexamethylenediamine, with a relative viscosity of 2.4 (measured on a 1% by weight solution in 96% strength sulfuric acid).

Component E
Ethylene/propylene rubber modified with 0.7% by weight of maleic acid/anhydride, with an MFI of 3 g per 10 min (measured with 2.16 kg/230° C.).

Preparation of the Molding Compositions

The components were mixed in a twin screw extruder at a melt temperature of from 310° to 340° C. The melt was passed through a water bath and granulated.

The dried granules were injection molded at from 310° to 330° C. to produce round disks (60×2 mm) and standard small specimens to determine the penetration energy by the DIN 53443 method, and the notched impact strength by the DIN 53453 method, respectively.

The composition of the molding compositions and the results of the measurements are to be found in Tables 3 and 4.

TABLE 3

| Molding Composition No. | C5*) | 13 | C6*) | 14 | 15 | 16 | C7*) | 17 |
|---|---|---|---|---|---|---|---|---|
| Component (% by weight) | | | | | | | | |
| A | 0 | 30 | 0 | 33 | 50 | 66 | 0 | 30 |
| $B_1$ | 84 | 54 | 66 | 33 | 16 | — | 66 | 36 |
| $D_1$ | 16 | 16 | — | — | — | — | 28 | 28 |
| $D_2$ | — | — | 28 | 28 | 28 | 28 | — | — |
| E | — | — | 6 | 6 | 6 | 6 | 6 | 6 |
| Penetration energy [Nm] | 2 | 18 | 2.5 | 65.2 | 66.7 | 69 | 1.8 | 36 |
| Notched impact strength [kJ/m²] | 1.6 | 4 | 2.9 | 4.9 | 8.5 | 11.7 | 1.7 | 4.5 |

*)Comparative experiment

TABLE 4

| Molding composition | C8*) | 18 | 19 | C9* | 20 | 21 | 22 | 23 | 24 |
|---|---|---|---|---|---|---|---|---|---|
| Component (% by weight) | | | | | | | | | |
| $A_1$ | — | 20 | 40 | — | 20 | 20 | 0 | 0 | 0 |
| $A_2$ | — | — | — | — | — | — | 20 | 40 | 20 |
| $B_2$ | 83 | 63 | 43 | 66 | 46 | 46 | 46 | 26 | 46 |
| $D_1$ | 17 | 17 | 17 | — | — | — | — | — | — |
| $D_2$ | — | — | — | 34 | 34 | 27 | 34 | 34 | 28 |
| E | — | — | — | — | — | 7 | — | — | 6 |
| Penetration energy [Nm] | 0.5 | 11 | 17 | 1 | 19 | 27 | 15 | 26 | 31 |
| Notched impact strength [kJ/m²] | 1 | 3.2 | 4.2 | 0.9 | 5.1 | 6.3 | 3.7 | 4.3 | 5.1 |

*)Comparative experiment
The molding compositions according to the invention had distinctly higher penetration energies and improved notched impact strengths.

We claim:

1. Molding composition containing a polyarylene ether A, obtained by grafting
   a) from 90 to 99.9% by weight of polyarylene ether $B_1$ with repeating structural elements (I)

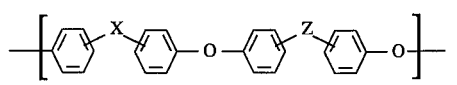

(I)

where X and Z, independently of one another are each —$SO_2$—, —O—, —S—, >C=O, a C—C single bond or —$CRR^1$—, R and $R^1$ are each hydrogen, $C_1$–$C_6$-alkyl or alkoxy, with the proviso that X and Z are not both —O—, and having halogen, methoxy, phenoxy, benzyloxy or amino end groups
   or
   b) from 90 to 99.9% by weight of polyarylene ether $B_2$ with repeating structural elements (I) which are substituted in the nucleus by $C_1$ to $C_6$ alkyl, alkoxy, phenyl, chlorine or fluorine and having halogen, methoxy, phenoxy, benzyloxy or amino end groups
with
   c) 0.1 to 10% by weight of maleic anhydride, itaconic acid anhydride or tetrahydrophthalic acid anhydride in the presence of from 0 to 1% by weight of a radical initiator.

2. A molding composition as defined in claim 1, wherein reactive compound c is maleic anhydride.

3. A molding composition as defined in claim 1, containing polyarylene ether A, obtained by reacting a polyarylene ether $B_1$ or $B_2$ with from 0.1 to 1.5% by weight of maleic anhydride.

4. A molding composition as defined in claim 1, wherein the polyarylene ether $B_1$ contains from 5 to 95 mol-% of repeating structural elements (II)

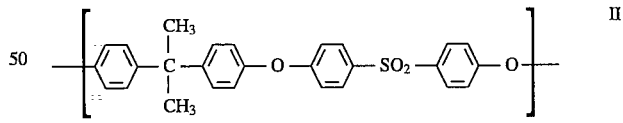

II and from 5 to 95 mol-% of repeating structural elements (III)

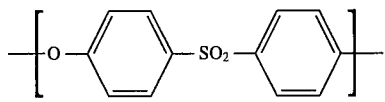

III

5. A molding composition as defined in claim 1 wherein the polyarylene ether $B_1$ or $B_2$ is a block or graft copolymer comprises segments with repeating structural elements (I) or repeating structural elements (I) which are substituted in the nucleus by $C_1$ to $C_6$ alkyl, alkoxy, phenyl, chloride or fluorine respectively and segments derived from polyamide, polyester, aromatic polycarbonate, polyester carbonate, polysiloxane, polyimide or polyether imide.

6. A molding composition as defined in claim 1, containing, based on the total of components A to C A) from 5 to 50% by weight of polyarylene ether A B) from 15 to 80% by weight of polyarylene ether $B_1$ or $B_2$ and further containing C) from 10 to 35% by weight of fibrous or particulate reinforcing agents or fillers or mixtures thereof.

7. A molding composition as defined in claim 1, containing, based on the total of components A to E A) from 1 to 99% by weight of polyarylene ether A, B) from 0 to 90% by weight of polyarylene ether $B_1$ or $B_2$, and further containing C) from 0 to 45% by weight of fibrous or particulate reinforcing agents or fillers or mixtures thereof, D) from 1 to 99% by weight of thermoplastic polyamide D and E) from 0 to 25% by weight of impact modifying rubber E.

8. A molding composition as defined in claim 7, wherein the thermoplastic polyamide D is a partially aromatic polyamide, composed of, based on the polyamide D, 40 to 90% by weight of units derived from terephthalic acid and hexamethylene diamine, 0 to 50% by weight of units derived from ε-caprolactam or 0 to 60% by weight of units derived from adipic acid and hexamethylene diamine, or mixtures thereof.

9. A molding composition as defined in claim 7, wherein the thermoplastic polyamide D is a partially aromatic polyamide, composed of, based on the polyamide D 40 to 90% by weight of units derived from terephthalic acid and hexamethylene diamine and 10 to 60% by weight of units derived from adipic acid and hexamethylene diamine and units derived from ε-caprolactam.

* * * * *